United States Patent
Lai

(10) Patent No.: US 8,148,908 B2
(45) Date of Patent: Apr. 3, 2012

(54) POWER SUPPLY CONTROL DEVICE FOR LAMP

(76) Inventor: Li-Chun Lai, Panciao (TW)

( * ) Notice: Subject to any disclaimer, the term of this patent is extended or adjusted under 35 U.S.C. 154(b) by 444 days.

(21) Appl. No.: 12/541,949

(22) Filed: Aug. 16, 2009

(65) Prior Publication Data

US 2011/0037391 A1 Feb. 17, 2011

(51) Int. Cl.
*H05B 37/02* (2006.01)
*G05F 1/00* (2006.01)

(52) U.S. Cl. ........ 315/247; 315/291; 315/224; 315/307; 315/119; 315/149; 363/101; 363/39; 363/135; 307/66; 307/89

(58) Field of Classification Search .......... 315/291, 315/307, 294, 224, 318, 312, 314, 119, 149, 315/247, DIG. 7, DIG. 4; 363/101, 39, 135, 363/551, 44; 307/66, 89
See application file for complete search history.

(56) References Cited

U.S. PATENT DOCUMENTS

| 5,872,429 | A | * | 2/1999 | Xia et al. | 315/194 |
| 6,144,169 | A | * | 11/2000 | Janczak | 315/224 |
| 6,222,285 | B1 | * | 4/2001 | Haley et al. | 307/129 |
| 6,486,616 | B1 | * | 11/2002 | Liu et al. | 315/291 |
| 6,661,634 | B2 | * | 12/2003 | Roberts et al. | 361/119 |
| 7,843,145 | B2 | * | 11/2010 | McKenzie et al. | 315/291 |
| 7,843,149 | B2 | * | 11/2010 | Lai | 315/291 |
| 7,903,441 | B2 | * | 3/2011 | Chen et al. | 363/101 |
| 8,063,512 | B2 | * | 11/2011 | Chen et al. | 307/66 |

* cited by examiner

*Primary Examiner* — Vibol Tan
(74) *Attorney, Agent, or Firm* — Chun-Ming Shih

(57) ABSTRACT

A power supply control device for lamp includes a control unit, the control unit receives a forward voltage signal and a reverse voltage signal simultaneously from a zero-crossover sampling circuit and determines if a connected load is an LED lamp, then the control unit turns on a tri-electrode AC switch (TRIAC) after an operating voltage for the LED voltage is reached, thereby outputting the AC power to an outlet for illuminating the LED lamp; since the TRIAC can be turned on with the forward voltage or the reverse voltage, the LED lamp is powered with a stable power supply to prevent the LED lamp from blinking.

10 Claims, 4 Drawing Sheets

POWER SUPPLY CONTROL DEVICE FOR LAMP

BACKGROUND OF THE INVENTION

1. Field of the invention

The present invention relates to a power supply control device for lamp, and more particularly, to a power supply control device which uses a control unit to determine if a connected load is an LED lamp and then turns on a tri-electrode AC switch (TRIAC) after a specific delay to illuminate the LED lamp, thereby extending the lifetime of the power supply circuit.

2. Description of the Prior Art

During Christmas times, Christmas trees will be decorated with LED lamps. A control device is used for controlling the power supply to illuminate the LED lamps when needed.

Presently relays are often used for implementing control switches and providing switching functions to stabilize the power supply; however, using relays as control switches could be disadvantageous in:

1. Relays operate mechanically and tend to be worn down after long term use and thus shorten the lifetime of the control circuit.

2. Relays take up large space and increase the total volume of the circuit, which is against the trend of miniaturization.

Therefore, the traditional power supply control devices present several shortcomings to be overcome.

In view of the deficiencies of the traditional power supply control devices, after years of constant researches, the inventor has consequently invented and proposed a power supply control device for lamp in the present invention.

SUMMARY OF THE INVENTION

It is an object of the present invention to provide a power supply control device for lamp, which determines if a connected load is an LED lamp, then the power supply control device turns on a tri-electrode AC switch (TRIAC) after an operating voltage for the LED voltage is reached, outputs the AC power to an outlet for illuminating the LED lamp, thereby reducing power lost and stabilizing the power supply.

It is another object of the present invention to provide a power supply control device for lamp, since the TRIAC can be turned on with the forward voltage or the reverse voltage, the LED lamp is powered with a stable power supply to prevent the LED lamp from blinking.

It is still another object of the present invention to provide a power supply control device for lamp, which uses a TRIAC for controlling the power supply, so the lamp can be illuminated to fade in/out.

In order to achieve the above object, the present invention discloses a power supply control device for lamp, which comprises an overcurrent protection circuit, an EMI filter circuit, an RC voltage step-down circuit, a rectifying regulator circuit, a filter circuit, a zero-crossover sampling circuit, a timer switch, an encoding circuit, an LED switch, a mode selector switch, a photo sensor, at least one driver circuit, and at least one TRIAC; wherein the overcurrent protection circuit breaks off with the AC power when the connected load to the outlet is overloaded to protect the load; the EMI filter circuit filters the AC power to obtain a filtered signal to avoid high frequency interference; an RC voltage step-down circuit reduces an voltage of the filtered signal from the EMI filter circuit to obtain an reduced-voltage signal for driving the control unit; a rectifying regulator circuit rectifies and regulates the reduced-voltage signal from the RC voltage step-down circuit to obtain an rectified and regulated signal; a filter circuit filters the rectified and regulated signal from the rectifying regulator circuit to provide a stable power signal to the control unit for the control unit to work normally; a timer switch sets a power supplying time and sends the set power supplying time to the control unit through the encoding circuit; the encoding circuit complements the control unit for the control unit comprises limited number of pins; the control unit receives an LED switch enable signal, which indicates that the connected load is the LED lamp; a mode selector switch selects a power mode and stores the selection in the control unit for the lamp to generate different light modes; a photo sensor is used for detecting the brightness of outdoor light to determine whether it is necessary to use the power supply; a zero-crossover sampling circuit obtains a forward voltage signal and a reverse voltage signal and sends the obtained signals to the control unit for processing, if the connected load is an LED lamp, the control unit uses the driver circuit to turn on the TRIAC after the forward voltage or the reverse voltage reaches the operating voltage of the LED lamp, thereby outputting the AC power to the outlet via the TRIAC and providing stable power supply.

DETAILED DESCRIPTION OF THE PREFERRED EMBODIMENT

Figure 1:
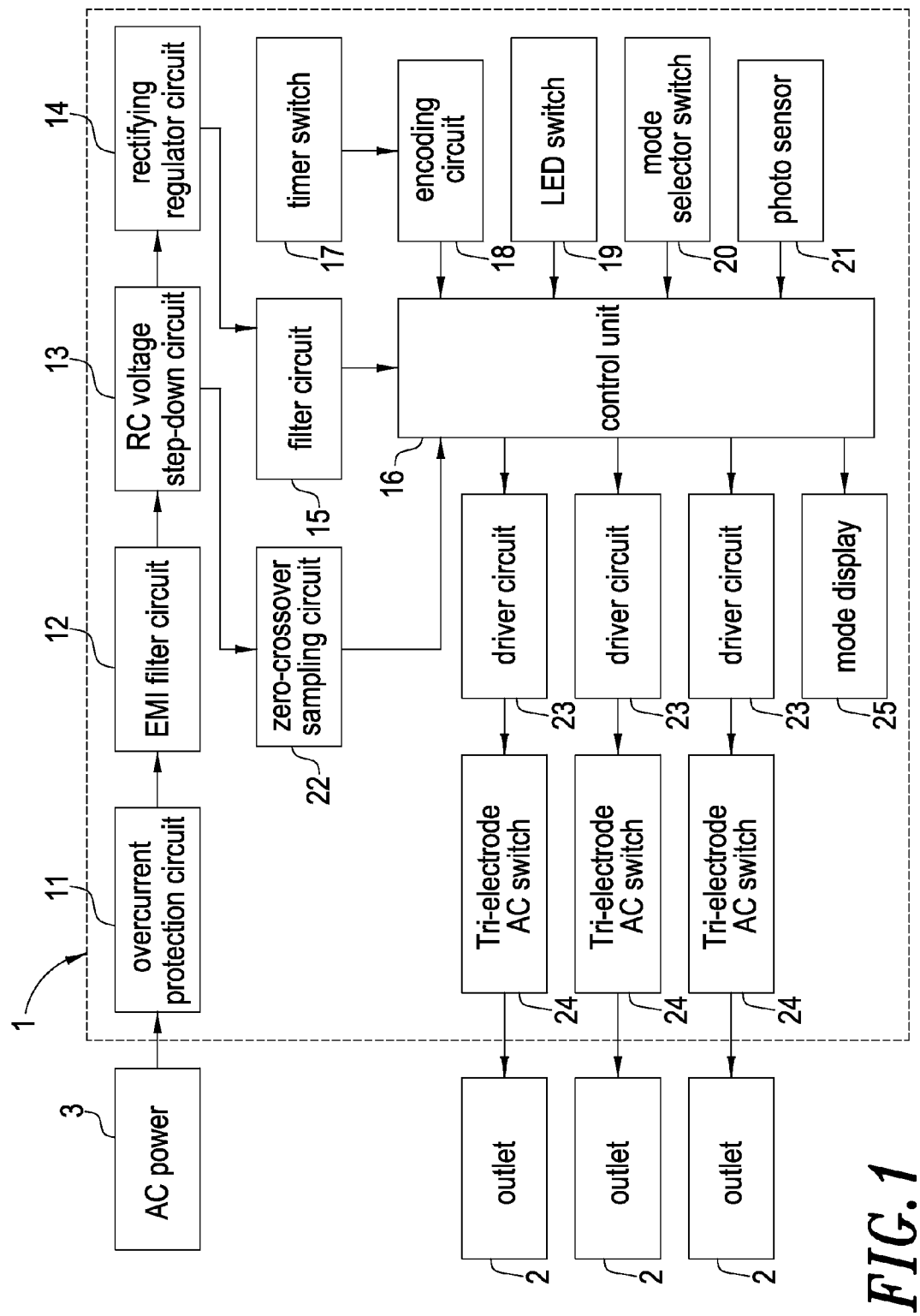
FIG. 1 illustrates a block diagram of a power supply control device for lamp in the present invention.
Figure 2:
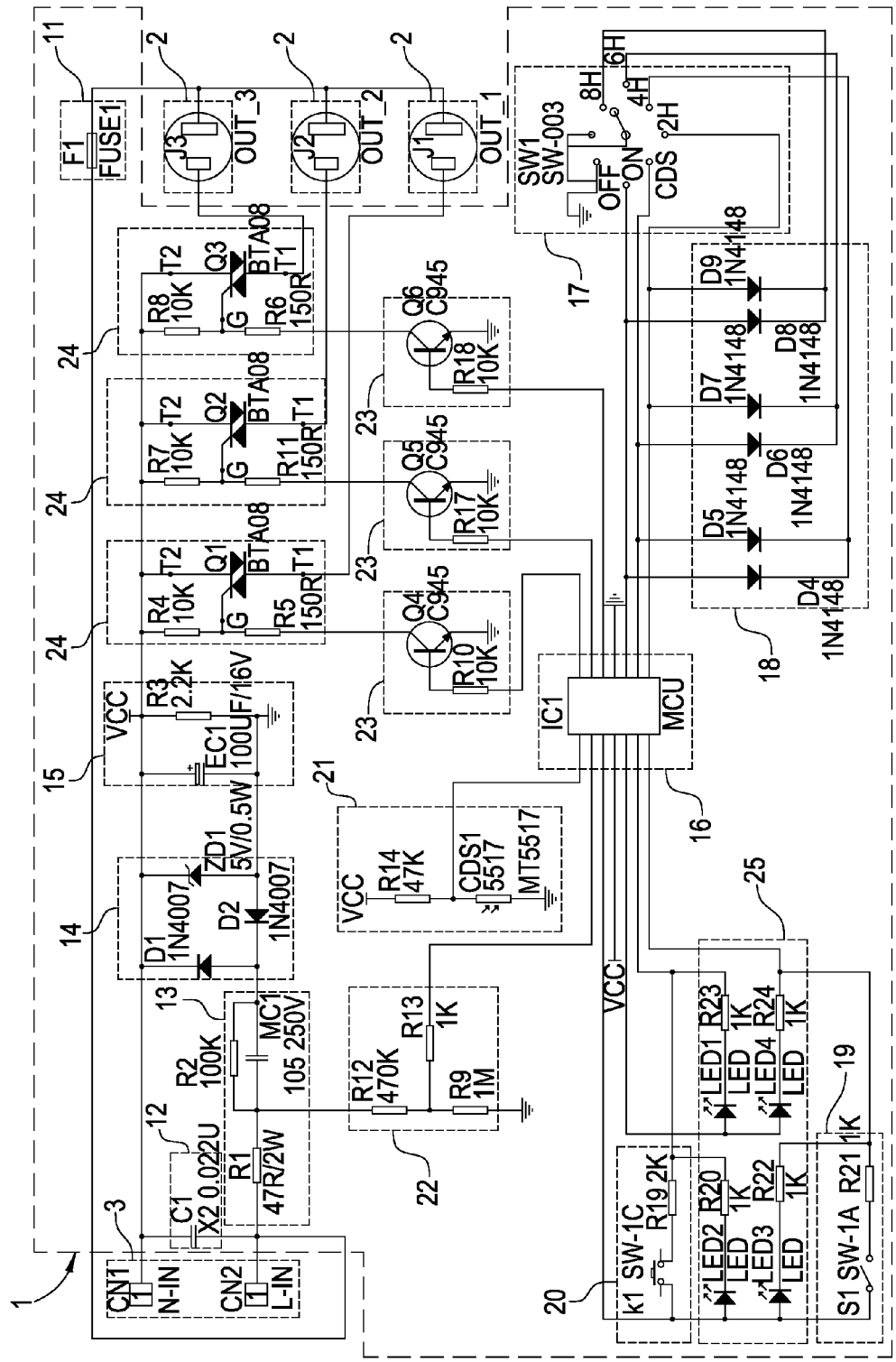
FIG. 2 illustrates a circuit diagram of the power supply control device for lamp in the present invention.

Please refer to FIG. 1 and FIG. 2 for views illustrating a power supply control device for lamp in the present invention. The control device 1 is disposed between an AC power 3 and an outlet 2, the outlet 2 electrically couples with a lamp or other electrical appliances. The control device 1 mainly comprises, an overcurrent protection circuit 11, an EMI (electromagnetic interference) filter circuit 12, an RC voltage step-down circuit 13, a rectifying regulator circuit 14, a filter circuit 15, a control unit 16, a timer switch 17, an encoding circuit 18, an LED switch 19, a mode selector switch 20, a photo sensor 21, a zero-crossover sampling circuit 22, a timer switch 23, at least one driver circuit 24, and at least one tri-electrode AC switch (TRIAC) 25.

The overcurrent protection circuit 11 connects with the AC power 3, wherein the overcurrent protection circuit 11 breaks off with the AC power 3 when the connected load to the outlet 2 is overloaded.

The EMI filter circuit 12 filters a signal from the AC power 3 to obtain a filtered signal to avoid high frequency interference.

The RC voltage step-down circuit 13 reduces a voltage of the filtered signal from the EMI filter circuit 12 to obtain a reduced-voltage signal which is provided to a control unit 16 for the control unit 16 to work normally.

The rectifying regulator circuit 14 rectifies and regulates the reduced-voltage signal from the RC voltage step-down circuit 13 to obtain an rectified and regulated signal.

The filter circuit 15 filters the rectified and regulated signal from the rectifying regulator circuit 14 to provide a stable power signal to the control unit 16.

The control unit 16 stores all configurations and to read and process the received power signal;

The timer switch 17 sets a power supplying time and sends the set power supplying time to the control unit 16 through the encoding circuit 18. The encoding circuit 18 complements the control unit 16 for the control unit only comprising limited number of pins.

The LED switch 19 connects the control unit 16. When the control unit 16 receives an LED switch enable signal, it is determined that the connected load is the LED lamp; when the control unit 16 receives an LED switch disable signal, it is determined that the connected load is a traditional lamp such as a tungsten lamp, an HID lamp or an incandescent lamp.

The mode selector switch 20 connects with the control unit 16. The mode selector switch 20 selects a light mode generated by the connected load and stores the selection in the control unit 16.

The photo sensor 21 connects with the control unit 16, wherein the photo sensor is used for detecting the brightness of ambient light to supply power only during the nighttime;

The zero-crossover sampling circuit 22 obtains a forward voltage signal and a reverse voltage signal from the AC power 3 and sends the obtained signals to the control unit 16 for processing; the zero-crossover sampling circuit sets a state to 1 when receiving the forward voltage signal and sets the state to 0 when receiving the reverse voltage signal so as to let the control unit determine whether the received voltage is forward or reverse.

The driver circuit 23 connects with the control unit 16.

The TRIAC 24 has a gate terminal (G) connected with the driver circuit 23, a first anode terminal (T1) connected with the outlet 2 and a second anode terminal (T2) connected with the AC power 3.

The mode display 25 shows a mode selected by the mode selector switch 20.

When the control unit 16 receives the obtained signals from the zero-crossover sampling circuit 22, the control unit 16 uses the driver circuit 23 to turn on the first anode terminal (T1) and the second anode terminal (T2) of the TRIAC 24 after a specific time according to the connected load, thereby outputting the AC power 3 to the outlet 2 via the TRIAC 24.

Furthermore, since the LED lamp has different operating voltage other than that of the traditional lamps, so the control unit 16 provides different delay times to accurately controls the turn-on time of the TRIAC 24.

Figure 3:
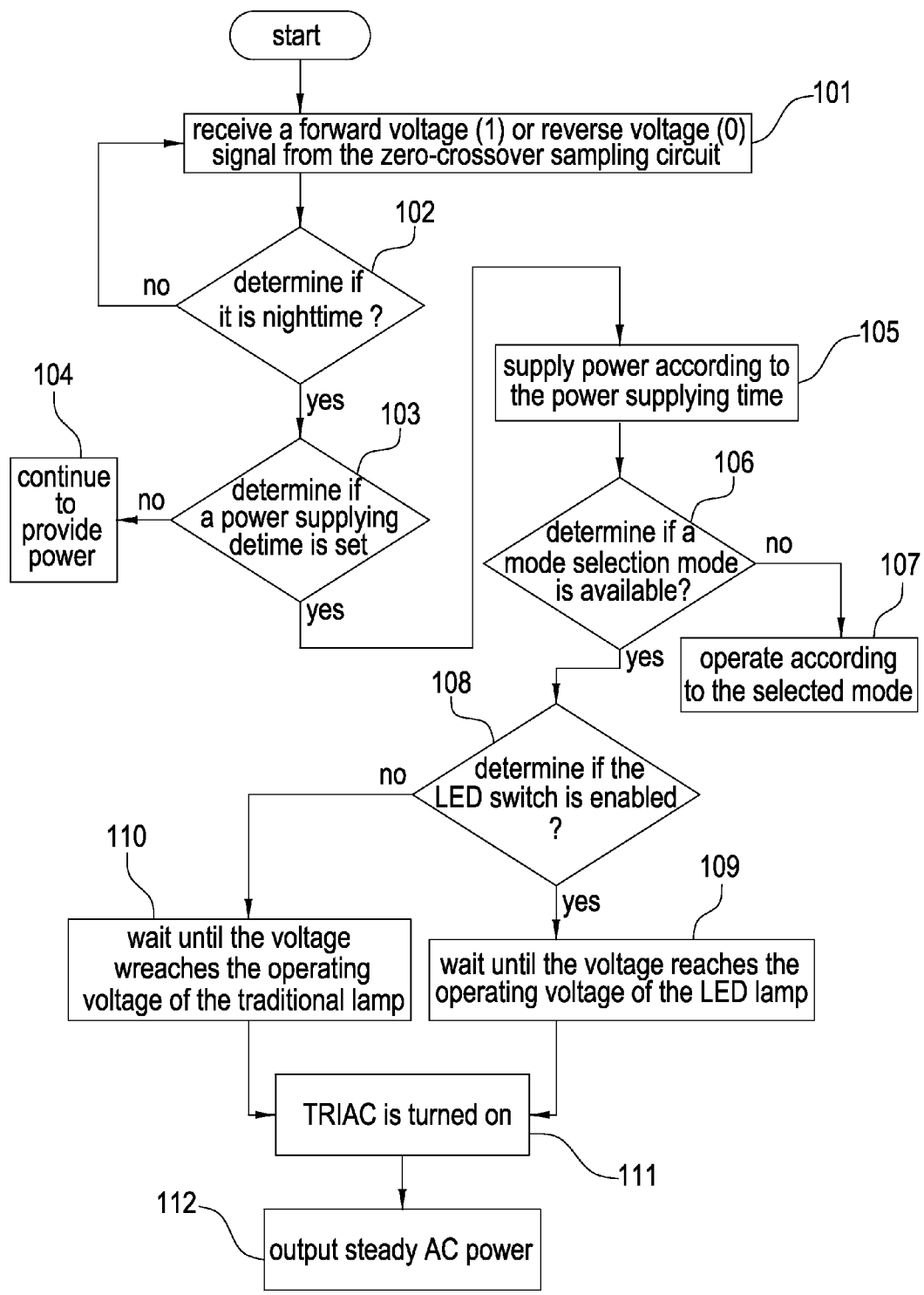
FIG. 3 illustrates a flow diagram of the operation of the power supply control device for lamp in the present invention.

Please refer to FIG. 3 for a flow diagram of the operation of the power supply control device for lamp in the present invention. When the control unit receives a forward voltage or reverse voltage signal (step 101) from the zero-crossover sampling circuit, it determines if it is nighttime by using the photo sensor (step 102); if not then it keeps receiving the signal from the zero-crossover sampling circuit 101; if so, then it determines if a power supplying time is set (step 103), if not, then it continues to provide power (step 104), if so, then the control unit supplies power according to the power supplying time (step 105); then it determines if a mode selection mode is available (step 106), if so, then it operates according to the selected mode (step 107), if not, the it determines if the LED switch is enabled (step 108), if so, then it is determined that the load is an LED lamp, and it waits until the voltage reaches the operating voltage of the LED lamp (step 109), if not, then it waits until the voltage reaches the operating voltage of the traditional lamp (step 110); when the operating voltage is reached, the TRIAC is turned on (step 111), the outlet outputs steady AC power (step 112) for the lamp.

Figure 4:
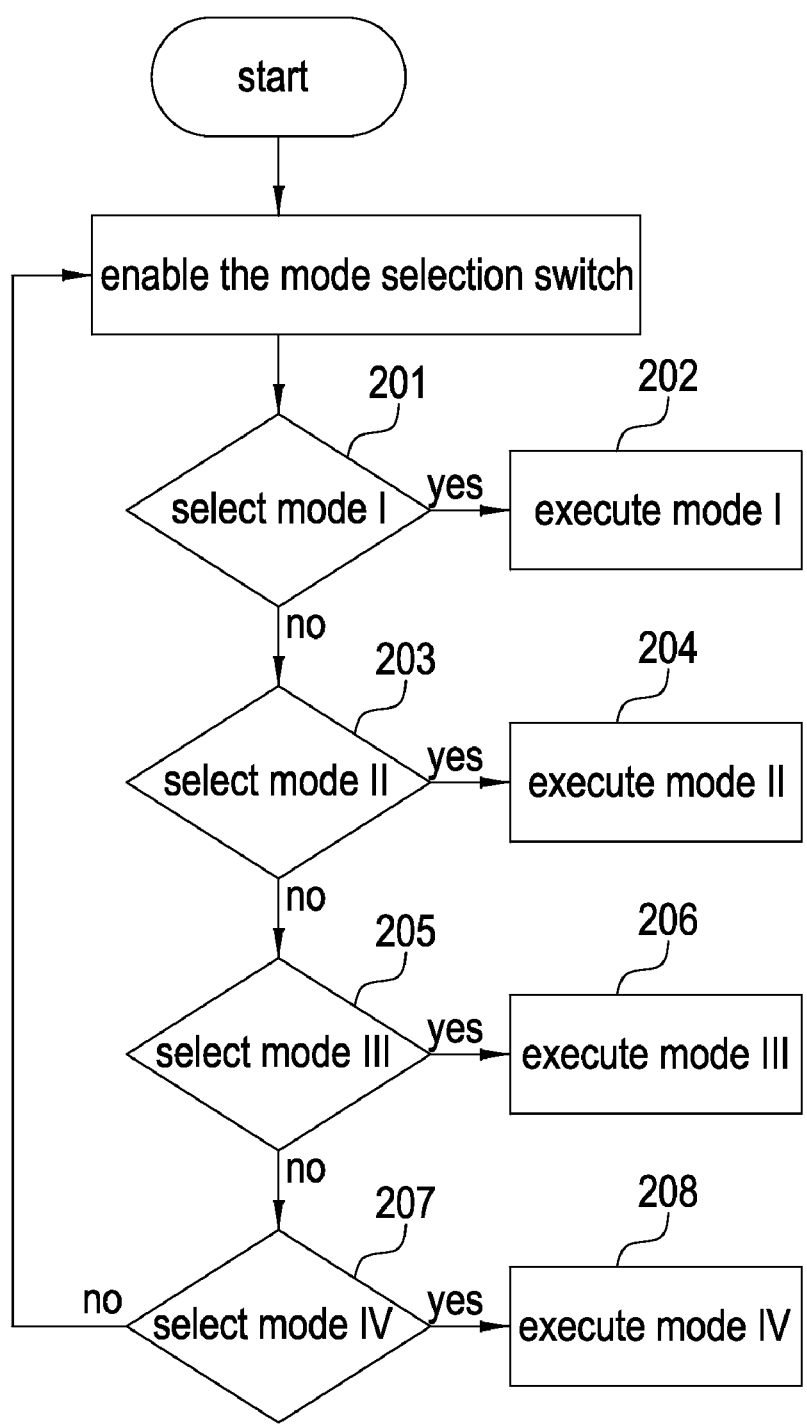
FIG. 4 illustrates another flow diagram of the operation of the power supply control device for lamp in the present invention.

Please refer to FIG. 4 for a flow diagram of the operation of the power supply control device for lamp in the present invention. In the preferred embodiment of the present invention, the number of the outlets is 3, and each outlet connects to a lamp; when the mode selector switch is enabled, the following selection modes are possible:

Mode I 201: The three outlets are enabled continuously to illuminate the lamp coupled with each outlet without blinking 202.

Mode II 203: The three outlets works independently to let each lamp on each outlet blink respectively 204.

Mode 205: The three outlets take turns to supply power to let each lamp on each outlet blink alternatively 206.

Mode IV 207: The three outlets supply power randomly to let each lamp on each outlet illuminate randomly; therefore the lamps are illuminated alternatively.

In the preferred embodiment, the four selection modes described above are not intended to limit the scope of the present invention.

The present invention discloses a power supply control device for lamp, while compared with other prior art techniques, is advantageous in:

1. The present invention uses a tri-electrode AC switch (TRIAC) to control the output of the AC power to long lifetime and high efficiency.

2. The present invention provides a power supply control device for lamp, since the TRIAC can be turned on with the forward voltage or the reverse voltage, the LED lamp is powered with a stable power supply to prevent the LED lamp from blinking.

3. The present invention uses a TRIAC for controlling the power supply, so the lamp can be illuminated to fade in/out.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A power supply control device for lamp, wherein the control device is disposed between an AC power and an outlet, the control device comprises:

an EMI (electromagnetic interference) filter circuit for filtering a signal from the AC power to obtain a filtered signal to avoid high frequency interference;

a RC voltage step-down circuit for reducing an voltage of the filtered signal from the EMI filter circuit to obtain an reduced-voltage signal;

a rectifying regulator circuit for rectifying and regulating the reduced-voltage signal from the RC voltage step-down circuit to obtain an rectified and regulated signal;

a filter circuit for filtering the rectified and regulated signal from the rectifying regulator circuit to provide a stable power signal to a control unit;

the control unit for storing all configurations and to read and process the received power signal;

a LED switch connecting the control unit for the control unit to determine if a connected load is an LED lamp;

a zero-crossover sampling circuit for obtaining a forward voltage signal and a reverse voltage signal and sending the obtained signals to the control unit for processing;

at least one driver circuit connecting with the control unit;

at least one tri-electrode AC switch (TRIAC) connecting with the AC power, the driver circuit and an outlet;

when the control unit receives the obtained signals from the zero-crossover sampling circuit, the control unit uses the driver circuit to turn on the TRIAC after a specific time according to the connected load, thereby outputting the AC power to the outlet via the TRIAC.

2. The power supply control device for lamp as claimed in claim 1 further comprising an overcurrent protection circuit, the overcurrent protection circuit connecting with the AC power, wherein the overcurrent protection circuit breaks off with the AC power when the connected load to the outlet is overloaded.

3. The power supply control device for lamp as claimed in claim 2, wherein the overcurrent protection circuit can be a fuse.

4. The power supply control device for lamp as claimed in claim 2, wherein the overcurrent protection circuit can be a thermal control switch.

5. The power supply control device for lamp as claimed in claim 1 further comprising a timer switch, the timer switch setting a power supplying time and sending the set power supplying time to the control unit through the encoding circuit.

6. The power supply control device for lamp as claimed in claim 1 further comprising a mode selector switch connecting with the control unit, wherein the mode selector switch selects a light mode generated by the load and storing the selection in the control unit.

7. The power supply control device for lamp as claimed in claim 6, wherein the selection of the mode selector switch can be shown on a mode display.

8. The power supply control device for lamp as claimed in claim 1 further comprising a photo sensor connecting with the control unit, wherein the photo sensor is used for detecting the brightness of ambient light.

9. The power supply control device for lamp as claimed in claim 1, wherein the TRIAC has a gate terminal (G) connected with the driver circuit, a first anode terminal (T1) connected with the outlet and a second anode terminal (T2) connected with the AC power.

10. The power supply control device for lamp as claimed in claim 1, wherein the zero-crossover sampling circuit is set to 1 when receiving the forward voltage signal and is set to 0 when receiving the reverse voltage signal to let the control unit determine whether the received voltage is forward or reverse.

\* \* \* \* \*